Patented Sept. 27, 1949

2,482,877

UNITED STATES PATENT OFFICE 2,482,877

POLYMERIZATION OF ETHYLENE

Louis Schmerling, Riverside, Ill., assignor to Universal Oil Products Company, Chicago, Ill., a corporation of Delaware No Drawing. Application May 31, 1946, Serial No. 673,611

10 Claims. (Cl. 260—683.15)

This invention relates to the production of ethylene polymers. It is more specifically concerned with the production of normally liquid polymers by the catalytic polymerization of ethylene in the presence of saturated hydrocarbon diluents and inert gases.

In one embodiment my invention relates to a polymerization process which comprises subjecting ethylene to the action of an organic peroxide polymerization catalyst at polymerizing conditions in the presence of an inert gas and a saturated hydrocarbon diluent containing at least three carbon atoms.

In the past the polymerization of ethylene generally has resulted in the formation of solid polymers or, in the few instances that liquid polymers were obtained, they generally were viscous, high boiling oils. I have found that by using an inert gas at certain temperatures in conjunction with a saturated hydrocarbon diluent, ethylene can be polymerized by organic peroxide catalysts to high yields of relatively low molecular weight liquid polymers. These polymers contain relatively straight-chain paraffins, but, what is probably more important, they also contain an appreciable percentage of olefins, particularly primary olefins.

Straight-chain and mildly branched normally liquid olefins in which the double bond is near the end of the chain are becoming increasingly important. Compounds of this type containing from 10 to 18 carbon atoms are particularly useful as starting materials in the preparation of detergents of the sodium alkyl benzene sulfonate and sodium alkyl sulfate types. Heretofore, there has been no large satisfactory source of this variety of unsaturated hydrocarbon. For example, olefins of this nature occur to a limited extent in cracked gasoline, but the methods of isolating them are relatively complex and expensive. These compounds have been prepared by the hydrogenation of naturally occurring fatty acids followed by dehydration of the resultant alcohols. However, this process has had only limited application chiefly because of the high cost of the starting material. In my process essentially straight-chain normally liquid olefins in which the double bond is in the terminal position are produced using as a starting material a substance which is cheap, readily isolated, and produced in large quantities as a refinery byproduct.

The ethylene charged to my process may be obtained from any source, such as the oxidation of ethane, the dehydration of ethyl alcohol, and particularly the thermal or catalytic cracking of higher boiling hydrocarbons. Many of the known processes for polymerizing ethylene require a highly purified charge stock, i. e., the ethylene has to be substantially free from other hydrocarbons and from dissolved oxygen. In contrast, the yield and quality of the polymer produced in my process are substantially unaffected by the presence of other hydrocarbons such as ethane, or by the presence of dissolved oxygen. Thus a refinery ethane-ethylene fraction may be charged to the process of this invention together with a suitable catalyst and a saturated hydrocarbon diluent containing more than two carbon atoms. The olefin is converted to a polymer thereof in good yields and the ethane in the product is simply and inexpensively separated from the polymer. There is no need for a costly charge stock purification step and, as a result, the capital and operating costs of the process are considerably reduced.

The diluent used in the present process may be any saturated hydrocarbon containing three or more carbon atoms or a mixture of such hydrocarbons. The preferred saturated hydrocarbons contain four or more carbon atoms, for the latter are more effective than those containing three carbon atoms. Unlike saturated hydrocarbons containing three or more carbon atoms, the use of ethane or methane as diluents in my process result in no enhanced yields. The saturated hydrocarbons mentioned herein comprise normal paraffins, such as normal butane, isoparaffins, such as isopentane, cycloparaffins, such as cyclohexane, and alkylcycloparaffins, such as methylcyclohexane. I am aware that certain substances, such as benzene, toluene, and methanol, have been suggested as solvents for this reaction. However, the use of saturated hydrocarbons gives unexpectedly better yields than any of the compounds suggested and makes possible the polymerization of ethylene at lower temperatures and pressures than usually are possible when using aromatic or alcoholic solvents. Furthermore, the saturated hydrocarbons act as diluents rather than solvents as shown by the fact that enhanced yields are obtained when ethylene is polymerized in the presence of propane and of isobutane at temperatures above the critical for these two substances.

The catalysts which may be used in the present process comprise those organic peroxides which catalyze the polymerization of ethylene. These substances include peracetic acid, diacetyl peroxide, toluic acid peroxide, oleic peroxide, benzoyl peroxide, tertiary butyl perbenzoate, ditertiary butyl peroxide, hexyl peroxide, tertiary butyl hydroperoxide, and methylcyclohexylhydroperoxide.

The inert gases that may be used in the present process consist of those gases that are not altered during the process and whose presence tends to decrease the molecular weight of the product. Examples of such materials are nitrogen, hydrogen, and carbon dioxide. Methane possesses the characteristics of this group of gases but not to the same degree.

The process of my invention may be carried out in batch operation by placing a quantity of the saturated hydrocarbon diluent, the inert gas, and the catalyst in a reactor equipped with a mixing device, adding the ethylene, heating to a reaction temperature while mixing the contents of the reactor, cooling after a suitable period of time, and recovering the polymer.

The preferred method of operation is of the continuous type. In this method of operation the ethylene, diluent, inert gas, and catalyst are continuously charged to a reactor maintained under suitable conditions of temperature and pressure. The reactor may be an unpacked vessel or coil or it may contain an adsorbent packing material, such as fire brick, alumina, dehydrated bauxite, and the like, upon which the catalyst is deposited and retained. The polymer is separated from the reactor effluent. The diluent, inert gas, and unconverted ethylene may be recycled to the reaction zone. The reaction temperature can be controlled to an appreciable degree by adjusting the amount of diluent charged to the process. The diluent absorbs the heat liberated during the reaction and thus prevents excessive temperature rises.

Another mode of operation that may be used is the fluidized type wherein the charge is passed upwardly through a bed of finely divided adsorbent material, thereby causing the particles to become motionalized and forming a fluid-like mass. A portion of the adsorbent may be continuously withdrawn from the reaction zone, cooled, and returned thereto; thus providing an efficient method of removing the heat of reaction.

Instead of separately adding the peroxide catalyst to the reaction zone, I have found that it frequently is more desirable and economical to form the catalyst in situ in the diluent and then charge the resulting solution to the reaction zone together with the ethylene. Formation of the peroxide in the saturated hydrocarbon may be accomplished by autoxidation, i. e., by heating the hydrocarbon while air is bubbled through it, preferably in the presence of a trace of peroxide formed in a previous autoxidation. Alternatively, the air may be passed through the hydrocarbon in the presence of an oxidation catalyst such as manganese stearate. In some cases it will be beneficial to add a minor amount of olefinic or cycloolefinic hydrocarbon to the saturated hydrocarbon before passing air through it.

In the continuous methods of carrying out my process, the catalyst preferably is added continuously to the reaction zone, but, if desired, it may be added intermittently, particularly when a packing material which retains catalyst is employed in the reactor.

Certain of the organic peroxides, such as tertiary butyl perbenzoate, have sharp decomposition temperatures; whereas others, such as di-tertiary butyl peroxide, decompose progressively over a relatively wide range of temperature. The peroxide becomes effective in catalyzing the polymerization reaction at the initial decomposition temperature. The presence of the inert gas has relatively little effect upon the molecular weight of the polymer until the reaction temperature is at least 25° C. higher than the initial decomposition temperature of the catalyst. Higher temperatures than this may be employed and in general the reaction rate is increased and the molecular weight of the polymer is decreased with increasing temperature. However, little advantage is gained if the temperature is more than about 150° C. higher than the decomposition temperature of the catalyst.

In contrast to many of the prior art processes, pressures as low as 15 atmospheres may be employed with good results in my process. Pressures as high as 500 atmospheres may be used, but the preferred range is from about 30 to about 100 atmospheres. In general, the molecular weight of the polymer increases with increasing pressure.

The concentration of catalyst utilizable in my process can vary over a wide range. For reasons of economy, it generally is desirable to use low concentrations of catalysts such as from about 0.1% to about 4% of the ethylene charged. Higher concentrations of catalyst result in lower molecular weight polymers and such products may be prepared by using catalyst concentrations up to 15% or more at relatively high temperatures in the presence of an inert gas.

In batch operation and in flow operations that do not employ packing materials, the contact time should be in the range of from about 3 minutes to about 6 hours. However, contact times of at least 10 minutes usually are preferred. In fixed bed operation the space velocity, defined as the volume of liquid charge per hour divided by the superficial volume of the packing, should be in the range of about 0.1 to about 10.

The ratio of diluent to ethylene charged to the reaction zone may vary over a relatively broad range. In general, the conversion of ethylene to polymer increases, but at a decreasing rate, as the weight ratio of diluent to ethylene is increased. A 1:1 ratio is satisfactory, but economic and operating considerations may dictate the use of higher or lower ratios.

Similarly, the ratio of inert gas to ethylene charged to the reaction zone may vary over a broad range but a 1:1 ratio generally is satisfactory.

The following examples are given to illustrate my invention, but they are not introduced with the intention of unduly limiting the generally broad scope of said invention. The experiments given under the examples were carried out by heating the reactants in glass liners in a rotating autoclave for 4 hours. Unless otherwise noted, the charge was 10 g. of tertiary butyl perbenzoate, 350 g. of methylcyclohexane, 40 atmospheres of initial ethylene pressure, and 60 atmospheres of initial inert gas pressure.

EXAMPLE I

*Effect of inert gas*

The data given below were obtained in experiments conducted at 180° C.

| Inert Gas | None | $N_2$ | $H_2$ | $CO_2$ | $CH_4$ |
|---|---|---|---|---|---|
| Polymer: | | | | | |
| Weight, grams | 69 | 61 | 56 | 59 | 48 |
| Melting Point, °C | 73 | Liq. | Liq. | Liq. | Liq. |

It can be seen that a solid polymer was obtained in the absence of an inert gas; whereas liquid polymers were obtained when inert gases were present in the reaction zone.

EXAMPLE II

*Effect of temperature*

The following experiments in which the inert gas was nitrogen were made to determine the effect of temperature.

| Temperature, °C | 115 | 180 |
|---|---|---|
| Polymer: | | |
| Weight, grams | 59 | 61 |
| Melting Point, °C | 80 | Liq. |

It can be seen that the nitrogen exerted substantially no effect on the properties of the polymer produced in the experiment conducted at the decomposition temperature of the catalyst; whereas it had a pronounced effect at the higher temperature. These and other data indicate that to bring about this effect, the reaction temperature should be at least about 25° C. higher than the initial decomposition temperature of the catalyst.

I claim as my invention:

1. A process for producing normally liquid polymers which comprises subjecting ethylene to the action of an organic peroxide polymerization catalyst at polymerizing conditions, including a temperature of from about 25° C. higher to about 150° C. higher than the initial decomposition temperature of said catalyst, in the presence of an inert gas and a diluent consisting essentially of at least one saturated hydrocarbon containing at least three carbon atoms.

2. A process for producing normally liquid polymers from ethylene which comprises subjecting ethylene to the action of an organic peroxide polymerization catalyst at a pressure above about 15 atmospheres, a temperature of from about 25° C. higher to about 150° C. higher than the initial decomposition temperature of the catalyst, and in the presence of an inert gas and a diluent consisting essentially of at least one saturated hydrocarbon containing at least three carbon atoms.

3. The process of claim 2 further characterized in that the saturated hydrocarbon diluent is an aliphatic paraffin.

4. A process for producing normally liquid polymers from ethylene which comprises subjecting ethylene to the action of an organic peroxide polymerization catalyst at a pressure above about 15 atmospheres, a temperature of from about 25° C. higher to about 150° C. higher than the initial decomposition temperature of the catalyst, and in the presence of an inert gas and a diluent consisting essentially of a cycloparaffin.

5. The process of claim 4 further characterized in that the cycloparaffin is methylcyclohexane.

6. A process for producing normally liquid polymers which comprises subjecting ethylene in the presence of an inert gas to the action of a hydrocarbon peroxide polymerization catalyst at a temperature of from about 25° C. higher to about 150° C. higher than the initial decomposition temperature thereof, said catalyst being dissolved in a diluent consisting essentially of at least one saturated hydrocarbon containing at least three carbon atoms, and said catalyst having been produced by oxidizing a portion of said diluent.

7. A process for producing normally liquid polymers of ethylene which comprises subjecting ethylene in the presence of an inert gas to the action of a hydrocarbon peroxide polymerization catalyst dissolved in a diluent consisting essentially of at least one saturated hydrocarbon containing at least three carbon atoms at a pressure above about 15 atmospheres and a temperature of from about 25° C. higher to about 150° C. higher than the initial decomposition temperature of the catalyst, said catalyst having been produced by oxidizing a portion of said diluent.

8. The process of claim 7 further characterized in that the saturated hydrocarbon diluent is an aliphatic paraffin.

9. The process of claim 7 further characterized in that the saturated hydrocarbon diluent is a cycloparaffin.

10. The process of claim 7 further characterized in that the saturated hydrocarbon diluent is methylcyclohexane.

LOUIS SCHMERLING.

REFERENCES CITED

The following references are of record in the file of this patent:

UNITED STATES PATENTS

| Number | Name | Date |
|---|---|---|
| 1,981,819 | Wiezevich et al. | Nov. 20, 1934 |
| 2,000,964 | Lenher | May 14, 1935 |
| 2,334,195 | Hopff et al. | Nov. 16, 1943 |
| 2,395,292 | Peterson et al. | Feb. 19, 1946 |
| 2,396,677 | Brubaker | Mar. 19, 1946 |
| 2,409,996 | Roedel | Oct. 22, 1946 |